July 18, 1933.  L. F. BAASH  1,918,443
TOOL JOINT
Filed July 11, 1930

Inventor
LAWRENCE F. BAASH
by W. Caldwell
his Attorney

Patented July 18, 1933

1,918,443

UNITED STATES PATENT OFFICE

LAWRENCE F. BAASH, OF LOS ANGELES, CALIFORNIA

TOOL JOINT

Application filed July 11, 1930. Serial No. 467,156.

This invention relates to a joint for connecting tubular members and relates more particularly to a tool joint for connecting or joining two lengths of drill pipe, or the like. It is a general object of the invention to provide a simple, practical, and effective tool joint that is adapted to pass fluid under extremely high pressures without leakage.

When drilling wells to great depths with the rotary method of drilling fluid is forced through the drill pipe at extremely high pressures. The common or usual tool joints employed for connecting the sections of drill pipe embody comparatively heavy screw threaded connections which often permit the circulating fluid to leak from the joints.

It is an object of the invention to provide a tool joint that incorporates the necessary strength and other features essential to devices of this character and includes means for preventing leakage of fluid under high pressures from the joint.

It is another object of the invention to provide a tool joint that embodies an improved and practical packing means that is effective in preventing the leakage of fluid from the threads on the pin and in the socket of the sections of the joint.

Another object of the invention is to provide a packing means of the character mentioned for embodiment in a tool joint that is actuated by the fluid under pressure passed by the tool joint.

It is another object of the invention to provide a tool joint embodying means for packing between the sections of the joint that does not limit or restrict the flow of the circulation fluid.

It is a further object of the invention to provide a packing means for preventing the leakage of fluid from between the sections of a tool joint that may be readily embodied in the usual or common forms of tool joints with slight inexpensive modifications.

Figure 1:
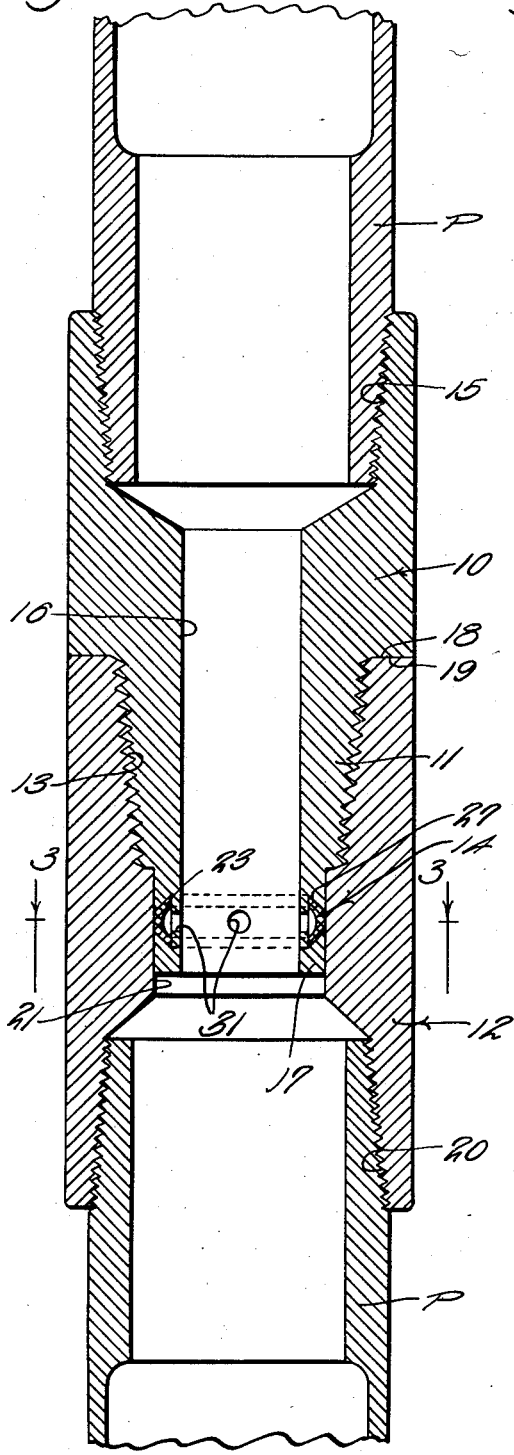
Figure 2:
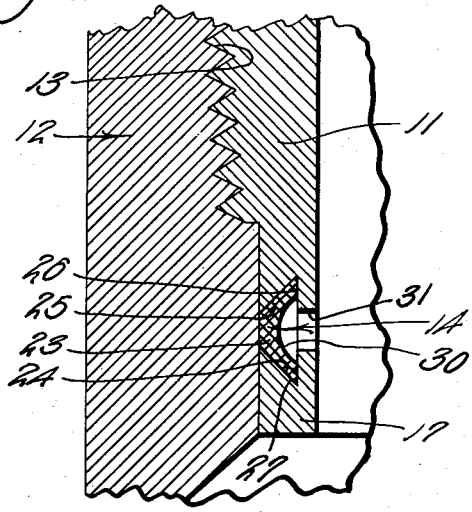
Figure 3:
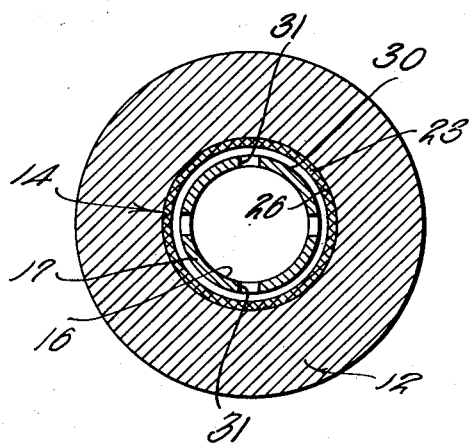

Other objects and features of my invention will be best and more fully understood from the following detailed description of a typical form and application of the invention, throughout which description reference is had to the accompanying drawing, in which:

Fig. 1 is a longitudinal detailed sectional view of the tool joint construction provided by the present invention. Fig. 2 is an enlarged longitudinal detailed sectional view of a portion of the joint illustrating the packing means included in the present invention, and Fig. 3 is a transverse detailed sectional view taken as indicated by line 3—3 on Fig. 1.

It is a feature of the present invention that the packing means provided for preventing the leakage of fluid from between the two sections of a tool joint may be incorporated or embodied in the common or usual forms of tool joints with only simple and inexpensive additions and modifications which do not in any way weaken or complicate the construction. Throughout the following detailed description the invention will be disclosed as embodied in a typical tool joint construction for connecting two sections of drill pipe, or the like. It is to be understood that the invention is not to be taken as limited to the particular type of tool joint illustrated in the drawing, but that it is to be taken as including any features that may fall within the scope of the claims.

The tool joint construction provided by the present invention includes, generally, a pin section 10 having a screw threaded pin 11, a box or socket section 12 having a screw threaded socket 13 for receiving the pin 11, and means 14 for packing between the sections 10 and 12 to prevent the leakage of fluid from between the pin 11 and the socket 13.

The sections 10 and 12 may be similar, generally, to the corresponding sections of the typical forms of tool joints. The sections 10 and 11 are intended primarily to connect two lengths of drill pipe P, or the like, and to pass fluid between the two lengths of pipe.

The male or pin section 10 is provided at one end with means for receiving or connecting with a length of drill pipe P and is provided at its opposite end with the screw threaded pin 11 for connection with the section 12. In the particular case illustrated in the drawing, the pin section 10 is the upper section of the tool joint and is provided at its upper end with a screw threaded socket 15 for receiving the screw threaded end of a length of pipe P. The socket 15 may be tapered upwardly and outwardly to receive the usual tapered screw threaded end of a length of drill pipe. In accordance with the general practice the section 10 is of comparatively heavy construction and is provided with a central longitudinal fluid passage 16. The pin 11 projects downwardly from the lower end of the section 10. The pin 11 may be tapered downwardly and inwardly and may be provided with the usual threads for connection with the section 12. In accordance with the invention a longitudinal or downwardly projecting extension 17 is provided at the lower end of the pin 11. The extension 17 is preferably of reduced diameter and is preferably cylindrical and smoothly finished. The fluid passage 16 extends longitudinally through the body portion of the section 10, the pin 11, and extension 17 to discharge from the lower end of the extension.

The box or socket section 12 of the joint is provided at its upper end with the tapered screw threaded socket 13 to receive the pin 11 of the section 10. The section 12 may be of the same external diameter as the pin section 10 and the upper end 18 of the section 12 may seat against the lower end 19 of the section 10 when the pin 11 is fully threaded into the socket 13. A tapered screw threaded socket 20 may be provided at the lower end of the section 12 to receive the screw threaded end of a length P of pipe. A central longitudinal opening 21 is provided in the socket section 12. The opening 21 is provided to receive the extension 17 and is preferably smooth to effectively carry the extension.

The means 14 is carried by the extension 17 and is provided to seal with the walls of the opening 21 to prevent the passage or leakage of fluid between the threads of the pin 11 and the socket 13. The means 14 includes one or more annular bodies of packing 23 arranged in a groove 24 or grooves in the extension 17 to seal with the walls of the opening 21.

In the particular embodiment of the invention illustrated in the drawing there is a single body of packing 23 arranged in a groove 24 in the extension 17 to seal with the walls of the opening 21. It is to be understood, however, that there may be as many units of the packing means 14 provided on the extension 17 to engage the walls of the opening 21 as desired or found necessary without departing from the broader aspects of the invention. The packing 23 is expansible and may be formed of rubber, rubber composition, or the like. The packing 23 is adapted to be expanded and maintained in tight sealing engagement with the walls of the opening 21 by the fluid under pressure passing through the opening 16, as will be hereinafter described.

In accordance with the preferred form of the invention the side walls 25 of the groove 24 converge outwardly from the bottom or base 26 of the groove to the exterior of the extension 17 so that the base 26 of the groove is wider than the outer or open side of the groove. The packing 23 is shaped to effectively seat in the groove 24 and has tapered or convergent sides 27 to seal against the convergent side walls of the groove. The outer side or exterior of the packing 23 at the open outer side of the groove 24 is cylindric to effectively engage the walls of the opening 21.

The invention provides means whereby the fluid under pressure in the opening 16 actuates the packing into effective sealing engagement with the walls of the opening 21. The means for expanding or actuating the packing to seal with the walls of the opening 21 includes an annular groove 30 on the inner side of the packing 23 and one or more openings 31 in the extension 17 communicating between the groove 30 and the opening 16. It is preferred to form the groove 30 with concave walls, as clearly illustrated in Fig. 2 of the drawing, so that the fluid under pressure acts upon a maximum area on the inner side of the packing 23 and acts radially relative to the axis of the curvature of the groove 30 to effectively compress the packing against the tapered side walls 24 of the groove and against the walls of the opening 21.

In accordance with the preferred embodiment of the invention the groove 30 is of greater diameter or width than the open outer side of the groove 24 so that a maximum area is provided on the inner side of the packing 23 that is exposed to the fluid under pressure to cause the packing to be effectively urged through the outer side of the groove 24 into effective engagement with the walls of the opening 21. The inner side of the packing 23 at the upper and lower edges of the groove 30 seats against the bottom or base 26 of the groove 24 so that the packing 23 has effective bearing and sealing engagement with the base of the groove 24. There may be any desired number of openings 31 for passing fluid under pressure into the groove 30. In the particular form of the invention illustrated in the drawing there are four equally spaced radial openings 31.

It is believed that the utility and practicability of the tool joint construction provided by the present invention will be readily apparent from the foregoing detailed description. The packing means 14 operates to positively prevent the leakage of fluid between the extension 17 and the walls of the opening 21 so that fluid passing through the joint cannot leak past the threads of the pin 11 and the socket 13. The groove 24 in the extension is formed so that when the packing 23 is actuated or expanded by the fluid under pressure admitted to the groove 30 through the openings 31 the packing will be tightly compressed against the walls of the opening 21 to form a fluid pressure tight seal. The walls 25 of the groove, being outwardly convergent, cause the packing 23 to be compressed against the inner side 26 of the groove and against the walls of the opening 21. The exposed relieved inner side or groove 35 in the packing 23 is of greater area than the outer side of the packing so that the fluid under pressure operates to exert a maximum amount of pressure on the sealing face of the packing. The walls of the groove 35 are curved so that the fluid pressure is exerted on the packing in various radial directions relative to the curvature of the said groove.

It is to be noted that the invention provides a simple and effective packing means that may be embodied in the usual types of tool joints with very little modification and without weakening or materially complicating the construction. The extension 17 may be readily provided on the pin of the usual tool joint pin section, while the bore of the socket section of a tool joint may be readily formed to receive the extension.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A tool joint including, a section having an opening and a socket at one end of the opening, a pin section, a pin on the pin section screw threaded into the socket, there being a fluid passage through the pin section, an extension on the pin extending into the opening, and packing means on the extension for sealing with the walls of the opening including expansible packing in an annular groove in the extension having outwardly convergent side walls, there being a fluid passage communicating between the fluid passage in the pin section and the groove.

2. A tool joint including, a section having an opening and a socket at one end of the opening, a pin section, a pin on the pin section screw threaded into the socket, there being a fluid passage through the pin section, an extension on the pin extending into the opening, and packing means on the extension for sealing with the walls of the opening, expansible packing in an annular groove in the extension to project from the outer open side of the groove to seal with the walls of the said opening, the side walls of the groove being outwardly convergent, there being a groove in the inner side of the packing and a passage communicating between said fluid passage and the inner side of the groove in the extension.

3. A tool joint including, a section having an opening and a socket at one end of the opening, a pin section, a pin on the pin section screw threaded into the socket, there being a fluid passage through the pin section, an extension on the pin extending into the opening, and packing means on the extension for sealing with the walls of the opening, expansible packing in an annular groove in the extension to project from the outer open side of the groove to seal with the walls of the said opening, the side walls of the groove being outwardly convergent, there being a groove in the inner side of the packing and a passage communicating between said fluid passage and the inner side of the groove in the extension, the area of the groove in the packing being greater than the area of the outer side of the packing.

4. A tool joint including, a section having an opening and a socket at one end of the opening, a pin section, a pin on the pin section screw threaded into the socket, there being a fluid passage through the pin section, an extension on the pin extending into the opening, and packing means on the extension for sealing with the walls of the opening, expansible packing in an annular groove in the extension to project from the outer open side of the groove to seal with the walls of the said opening, the side walls of the groove being outwardly convergent, there being a groove in the inner side of the packing and a passage communicating between said fluid passage and the inner side of the groove in the extension, the walls of the groove in the packing being concave and having an area greater than that of the outer open side of the groove in the extension.

LAWRENCE F. BAASH.